United States Patent

[11] 3,547,230

| [72] | Inventor | William E. Shank |
| | | Waynesboro, Pa. |
| [21] | Appl. No. | 766,133 |
| [22] | Filed | Oct. 9, 1968 |
| [45] | Patented | Dec. 15, 1970 |
| [73] | Assignee | Litton Industries, Inc. |
| | | Waynesboro, Pa. |
| | | a corporation of Delaware |

[54] DIAMETER BRAKE AND LOCKING DEVICE FOR A ROTATABLE SHAFT
8 Claims, 7 Drawing Figs.

| [52] | U.S. Cl. | 188/75 |
| [51] | Int. Cl. | F16d 49/00 |
| [50] | Field of Search | 188/74, 75, 24, 152.01 |

[56] References Cited
UNITED STATES PATENTS
2,747,698  5/1956  Currie ............................ 188/75X FOREIGN PATENTS
| 518,408 | 11/1955 | Canada | 188/152(.01) |
| 521,819 | 3/1921 | France | 188/24 |
| 1,313,503 | 11/1962 | France | 188/24 |
| 330,478 | 6/1930 | Great Britain | 188/24 |

*Primary Examiner*—George E.A. Halvosa
*Attorney*—Diller, Brown, Ramik & Holt

ABSTRACT: This disclosure relates to an apparatus for braking and locking a rotatable shaft of a machine tool, such as a rotary-type truing tool that consists of a motor-driven diamond impregnated roller. The hydraulic brake assembly comprises two brake members held by equal opposing forces to stop rotation of a brake disc or shaft. The brake members or shoes are pivotally mounted on a supporting member and are mechanically interlocked through a cam device to clamp the brake disc with an equal amount of clamping pressure from each brake member to prevent deflection of the shaft. The clamping movement is hydraulically initiated by a fluid pressure actuated piston against one of the brake members.

PATENTED DEC 15 1970 3,547,230
SHEET 1 OF 3
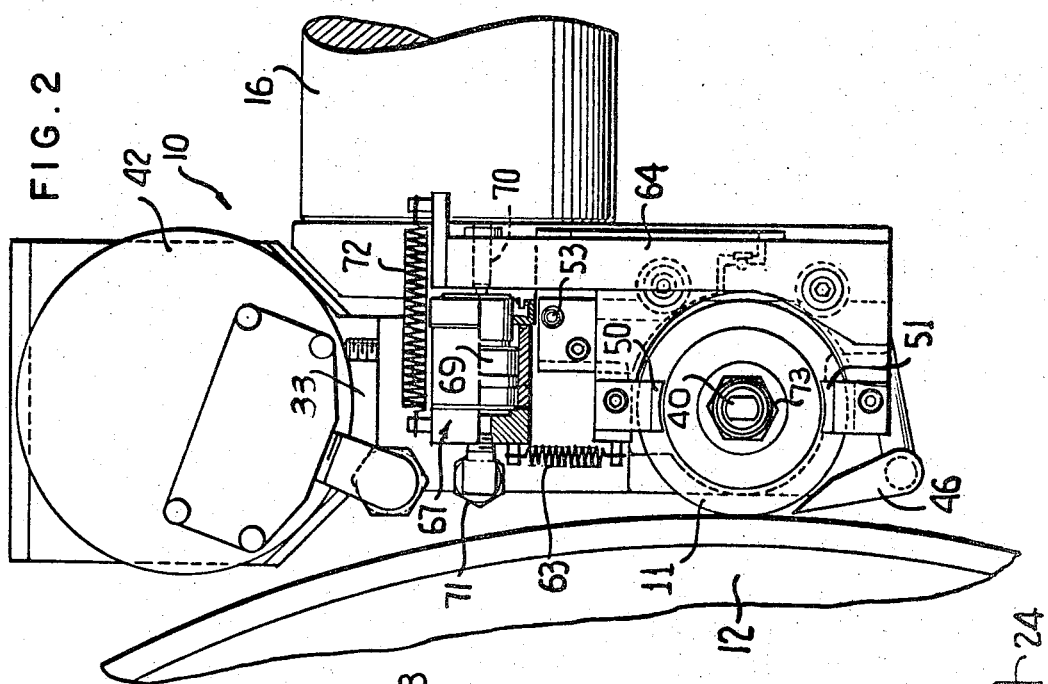
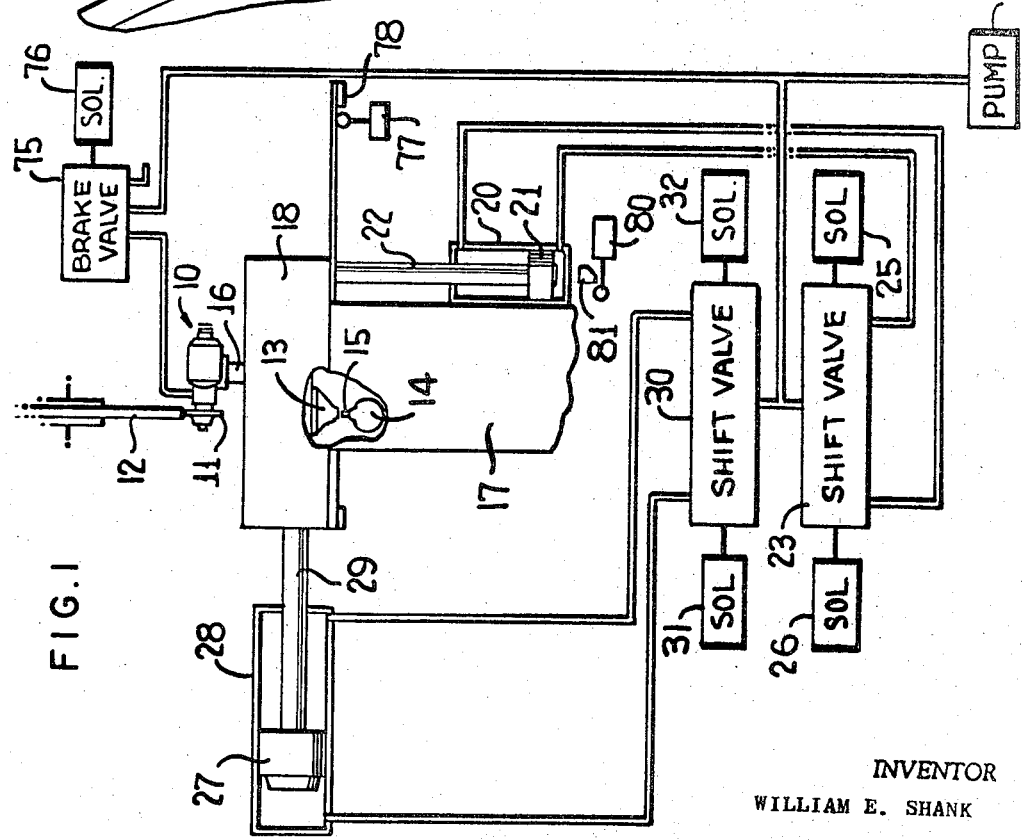
INVENTOR
WILLIAM E. SHANK
Mason, Porter, Diller & Brown
ATTORNEYS

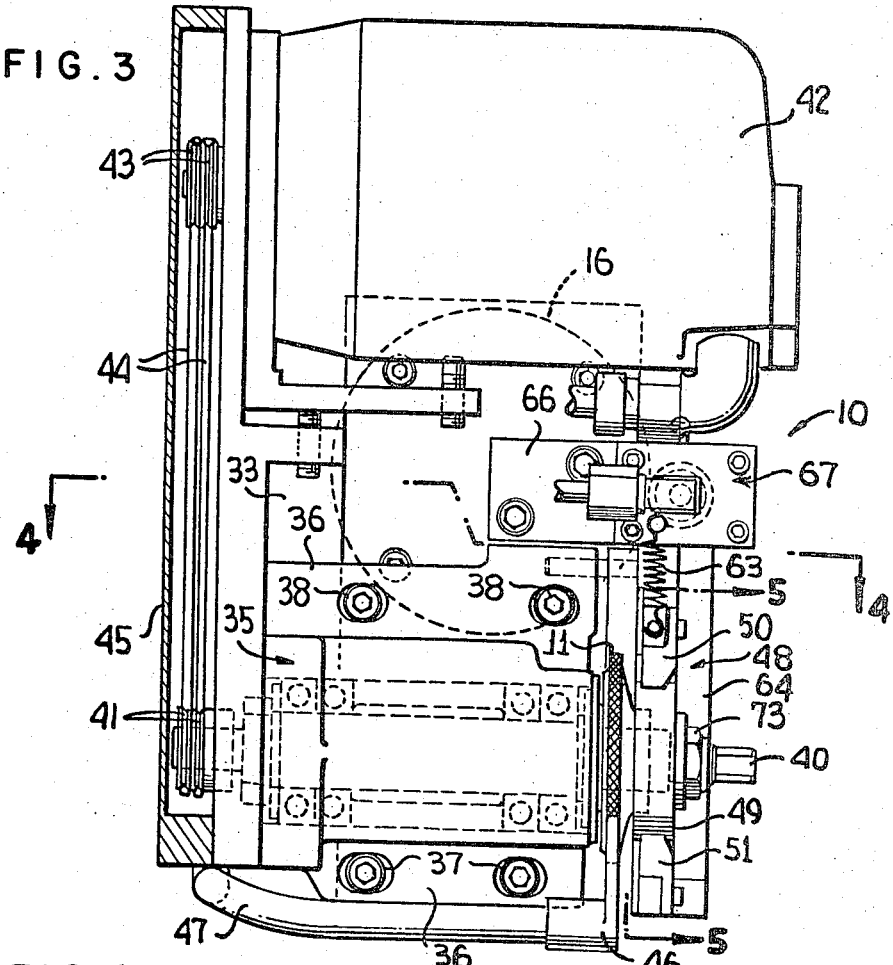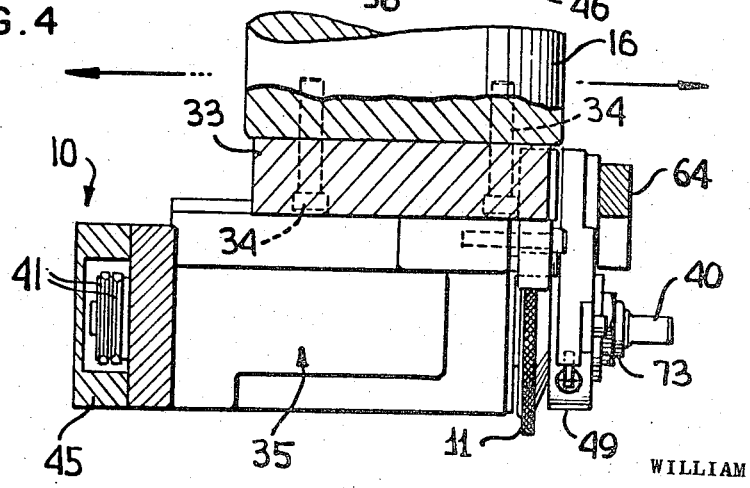

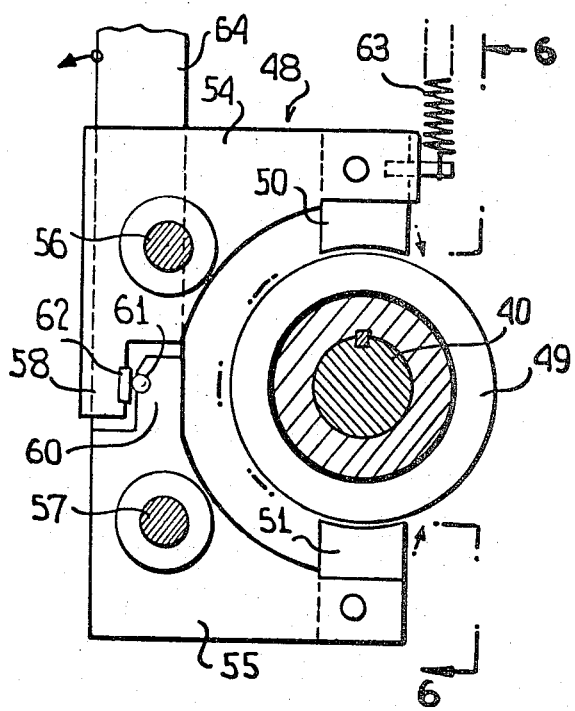
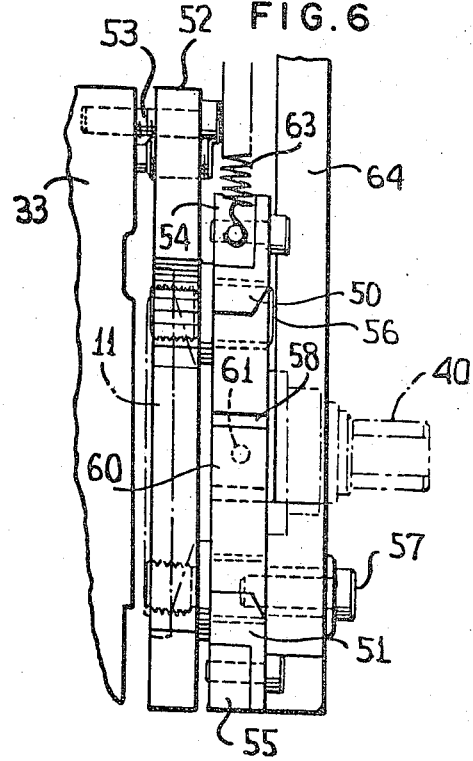
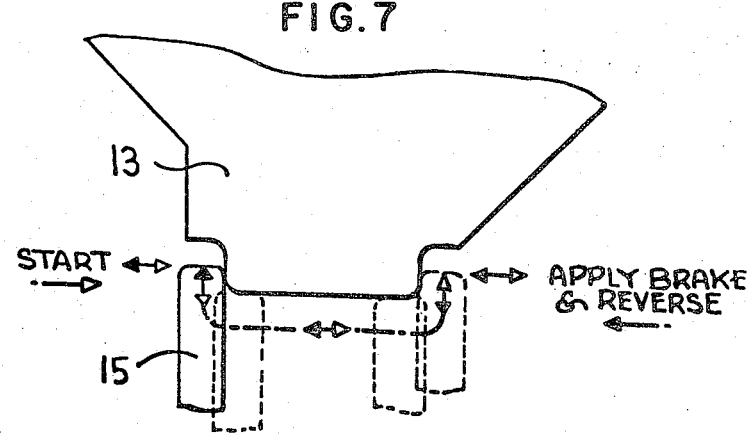

DIAMETER BRAKE AND LOCKING DEVICE FOR A ROTATABLE SHAFT

This invention relates in general to a new and useful improvement in means for locking a rotatable shaft, and more particularly to means for locking the shaft of a truing mechanism for truing grinding wheels. This brake will enable a truing roller to be fixed against rotation and held during the reverse pass across the operative face of the grinding wheel including the rounded corners thereof. By holding the truing or dresser roller stationary, only a few of the diamonds contact the cylindrical face of the grinding wheel and a very light finish truing cut is produced.

Prior to this invention, the rotary truing roller was locked by a single locking plunger which is mounted in alignment with an annular flange carried by the shaft of the dressing roller and with which the extreme end of the locking plunger is engaged when the locking plunger is projected under fluid pressure. This method of locking the truing roller has several deficiencies. First, the locking of the truing roller by the single locking plunger is not positive. Secondly, because the locking plunger engaged the annular flange at one point only, the rotary shaft was easily deflected. Further, the locking plunger was subject to extreme wear due to the small surface area thereof in contact with the rotating annular flange in which a small surface area functions as a friction brake.

Accordingly, a primary object of this invention is to brake and lock the shaft of a truing mechanism by applying equal pressure to opposite sides of a brake drum or shaft to prevent deflection of the shaft.

Another object is to clamp the shaft diameter in a line parallel to the surface of the grinding wheel to avoid any deflection of the roller shaft toward or away from the grinding wheel.

Another object is to provide brake members or shoes having a large surface area to contact the diameter of the rotatable shaft.

Another object is to provide means to increase the clamping pressure through a large piston against a lever arm which is mechanically interlocked through a cam device to clamp the brake disc with an equal amount of clamping pressure from each braking member or brake shoe.

A further object of this invention is to provide a novel brake shoe assembly for use with a brake disc, the brake shoe assembly including a pair of pivotally mounted supports of which one only has associated therewith an actuator, the supports having at remote ends thereof and in opposed relation to the brake discs brake shoes and the opposite ends of the supports reacting against one another to provide for the application of equal clamping pressure by the brake shoes on the brake disc.

With the above and other objects in view that will hereinafter appear, the nature of the invention will be more clearly understood by reference to the following detailed description, the appended claims and the several views illustrated in the accompanying drawings:

IN THE DRAWINGS

FIG. 1 is a schematic plan view showing the operational environment of the brake mechanism of this invention;

FIG. 2 is a fragmentary enlarged side elevational view of the grinding wheel of FIG. 1 and shows specifically the details of the truing mechanism and the associated brake mechanism;

FIG. 3 is an elevational view of the brake mechanism of FIG. 2, as viewed from the left side thereof with parts broken away and shown in section;

FIG. 4 is a fragmentary horizontal sectional view taken along the line 4—4 of FIG. 3 and shows specifically the mounting of the truing mechanism;

FIG. 5 is a fragmentary sectional view taken long the line 5—5 of FIG. 3 and shows specifically the details of the brake mechanism;

FIG. 6 is a fragmentary vertical sectional view taken along the line 6—6 of FIG. 5 and shows further the details of the brake mechanism; and FIG. 7 is a schematic showing the relative movement of the truing roller as compared with a profile for controlling the movement thereof.

Referring now to the drawings in detail, reference is made first to FIG. 1 wherein the general environmental structure of the brake and truing mechanism is illustrated. It will be seen that the truing mechanism, which is generally referred to by the numeral 10, has the diamond impregnated truing roller 11 thereof illustrated in engagement with a grinding wheel 12 and performing a truing operation thereon. The movement of the truing roller 11 relative to the grinding wheel 12 is controlled by a fixed profile 13 which is engaged by a follower assembly 14 including a follower 15 which is in direct sliding contact with the profile 13 and which is of the same width as the truing roller 11 and has an end contour corresponding to the peripheral contour of the truing roller 11.

The manner in which the truing mechanism 10 is operated is more specifically disclosed in the commonly assigned U.S. Pat. No. 3,121,423 of Ralph E. Price, et al. granted Feb. 18, 1964. Accordingly, there will be described here only such operation of the mechanism for shifting and positioning the truing mechanism 10 as will be necessary to understand the invention.

The truing mechanism 10 is mounted on a truing bar 16 which is carried by a slide 17 for movement toward and away from the axis of the grinding wheel 12. The slide 17, in turn, is slidably mounted on a carriage 18 which is mounted for traverse movement parallel to the axis of the grinding wheel 12. The carriage 18 is mounted on a suitable portion of the bed (not shown) of the grinding machine of which the grinding wheel 12 is a part.

The truing mechanism 10 is advanced and retracted by means of a cylinder 20 which is secured to the slide 17 and in which there is positioned a piston 21. The piston 21 has a piston rod 22 coupled to the carriage 18. The piston 21 and the cylinder 20 normally function to hold the follower 15 in engagement with the profile 13. The actuation of the cylinder 20 is controlled by means of a valve 23 which is connected to a suitable pressure pump 24. The valve 23 is, in turn, actuated by suitable solenoids 25 and 26.

Traversing movement of the carriage 18 is effected by means of a piston 27 which is mounted within a cylinder 28. The piston 27 has a piston rod 29 connected to the carriage 18. The movement of the piston 27 is controlled by means of a conventional valve 30 which is connected to the pump 24 for receiving fluid under pressure therefrom. The valve 30 is actuated and positioned by means of a pair of solenoids 31 and 32 in a conventional manner.

Referring now to FIGS. 2 and 4 in particular, it will be seen that the truing mechanism 10 includes a rigid frame 33 of a suitable configuration. The frame 33 is removably secured to the truing bar 16 by means of a plurality of fasteners 34.

As is best shown in FIGS. 3 and 4, the lower portion of the frame 33 supports a spindle assembly 35 which includes mounting ears 36 having slotted openings 37 therein receiving fasteners 38 which secure the spindle assembly to the frame 33.

The spindle assembly 35 includes a shaft 40 which is mounted for rotation and which is firmly supported so as to be free of vibrations. One end portion of the shaft 40 has mounted thereon the truing roller 11 while the other end of the shaft 40 is provided with a dual grooved pulley 41 for effecting the driving of the shaft 40.

The upper portion of the frame 33 has mounted thereon a power unit 42 which is preferably in the form of an electric motor, but which may be in the form of any desired type of power unit. It is to be understood that the power unit 42 is of a conventional type and is mounted on the frame 33 in a manner wherein it may be vertically adjusted. The power unit 42 is provided with a dual grooved pulley 43 which is aligned with the pulley 41 and which is drivingly connected thereto by means of belts 44. It is to be noted that the pulleys 41 and 43 and the belts 44 are encased within a housing 45.

The frame 33 also has secured thereto a coolant head 46 for distributing coolant on the truing roller 11 and the grinding wheel 12 during a truing operation. A coolant supply line 47 is suitably connected to the coolant head 46.

Referring now to FIG. 3, it will be seen that there is illustrated the details of the brake which is the subject of this invention, the brake being generally referred to by the numeral 48. The brake functions to both stop the rotation of the truing roller 11 and to hold the truing roller 11 against rotation during one part of a truing operation on a grinding wheel. Basically, the brake 48 includes a brake drum 49, which is mounted on the shaft 40 adjacent to and outwardly of the truing roller 11, and a pair of opposed shoes 50 and 51 which are engageable with the brake drum 49 in diametrically opposed relation.

Referring now to FIG. 6 in particular, it will be seen that the brake 48 is carried by a mounting plate 52 which is rigidly secured to the frame 33 by means of a plurality of fasteners 53 to assure the alignment of the shoes 50, 51 with the brake drum 49. The mounting plate 52 has mounted thereon for pivotal movement a pair of shoe supports 54 and 55 which are best illustrated in FIG. 5. The shoe support 54 carries the shoe 50 while the shoe support 55 carries the shoe 51 with the shoe supports 54 and 55 being pivotally mounted on pivots 56 and 57, respectively.

In order that the shoes 50 and 51 may move in unison, the shoe supports 54 and 55 are interconnected. It is to be noted that the shoe supports 54 and 55 have overlapping end portions 58 and 60, respectively. The end portion 60 carries a hardened ball 61 which is engaged with a hardened insert 62 carried by the end portion 58.

At this time it is pointed out that the shoes 50 and 51 are constantly urged away from the brake drum 49 by means of a tension spring 63 which is coupled to the shoe support 54. The spring 63 urges the shoe 50 in a counterclockwise direction with the result that the hardened insert 62 will move to the right, moving the ball 61 to the right and urging the shoe 51 in a clockwise direction.

The shoes 50 and 51 are moved into contact with the brake drum 49 by means of a lever 64 which is secured to the shoe support 55 and which is actuated in a manner to be described hereinafter. It is to be noted that the lever 64, when actuated, urges the shoe 51 in a counterclockwise direction. At the same time, the ball 61 will move to the left, moving the insert 62 to the left and effecting clockwise movement of the shoe 50 into engagement with the brake drum 49.

It is to be understood that the structure of the shoe supports 54 and 55 may vary. In a like manner, the construction and attachment of the shoes 50 and 51 may vary. Accordingly, no attempt has been made to show the specific details thereof.

Referring now to FIGS. 2 and 3 in particular, it will be seen that there is secured to the central portion of the frame 33 a fluid motor 67. The fluid motor 67 includes a combination bracket and cylinder 66 and is attached to the frame 33 by means of the bracket. The fluid motor 67 also includes a piston 69 which is positioned within the cylinder 66 for relative axial movement. The lever 64 is provided with an adjustable pin 70 which engages the exposed end of the piston 69 eccentrically of the center thereof.

Fluid is supplied into the cylinder 66 through a fitting 71. When fluid under pressure is directed into the cylinder 66, the piston 69 will move to the right, as is shown in FIG. 2, swinging the lever 64 in a clockwise direction so as to actuate the brake 48. It is to be noted that the lever 64 is normally retained in a brake releasing position by means of a tension spring 72 which has one end connected to the upper end of the lever 64 and the opposite end connected to the cylinder 66. It is also to be noted that the tension spring 63 is connected to the cylinder 66, and the shoe support 54.

At this time it is pointed out that the brake drum 49 is in the form of a detachable sleeve which is suitably mounted on the shaft 40 in any desired manner. The brake drum 49 and the truing roller 11 are readily removable from the shaft 40 by the removal of a retaining nut 73 which is clearly shown in FIG. 3. It will be readily apparent from FIGS. 3 and 4 that the truing roller is in the form of a relatively thin wheel. In actual practice the wheel has a width of 0.1875 inch and a diameter on the order of 3 inches. In addition, it is to be noted that the truing roller has rounded corners. These rounded corners no only facilitate the proper truing of the rounded corners of the grinding wheel 12, but also facilitate the movement of the follower 15 around the contours of the profile 13, as is best shown in FIG. 7. It is to be noted that the contour of the follower 15, which corresponds to that of the truing roller 11, is clearly shown in FIG. 7.

Referring once again to FIG. 1, it will be seen that the operation of the brake 48 is controlled by means of a valve 75. The valve 75 is suitably connected to the pump 24 and the actuation thereof is controlled by a solenoid 76.

At this time it is also pointed out that the actuation of the valve 30 for controlling the traversing of the carriage 18 may be controlled by suitable limit switches, such as the limit switch 77 which is operable by means of an abutment 78 carried by an extension of the carriage 18. In addition, it is to be noted that the limit of retraction of the slide 17 may be controlled by a limit switch 80 which is engaged by an abutment 81 carried by the slide 17.

OPERATION

Referring now generally to FIGS. 1 and 7, it is to be understood that the truing roller 11 will normally be disposed in a retracted position at one side of the grinding wheel 12. At this time the follower 15 will be out of contact with the profile 13. When it is desired to initiate the truing operation, the solenoid 31 will be actuated to shift the valve 30 to a position where fluid is directed into the left-hand end of the cylinder 28, thereby moving the carriage 18 to the right until the follower 15 is aligned with the profile 13 adjacent a corner portion thereof. Then with the truing roller 11 rotating, the valve 23 directs fluid into the cylinder 20 so as to urge the slide 17 toward the grinding wheel 12 with the result that the follower 15 comes into contact with the profile 13 and the truing roller 11 engages the grinding wheel 12 at the left-hand corner thereof. Then, while the slide 17 is still urged toward the grinding wheel 12, the valve 30 is actuated to move the carriage 18 to the right with the result that the follower 15 moves around the left-hand corner of the profile 13 for the truing roller 11 to dress the left-hand corner of the grinding wheel 12. Then the carriage 18 is moved further to the right with the peripheral face of the grinding wheel 12 being trued. Thereafter, as the carriage 18 continues to move to the right, the right-hand corner of the grinding wheel 12 is trued. When the carriage and slide reach a predetermined point in the truing of the right-hand corner of the grinding wheel 12, the movement of the carriage 18 is reversed. At this time, the power unit 42 is deenergized and the brake 48 is actuated to not only stop the rotation of the truing roller 11, but also to hold it in a fixed position.

The carriage 18 moves back toward the starting position thereof until the follower 15 is in contact with the profile 13 at the right-hand corner thereof, after which the truing roller 11 is again moved to the left, truing the right-hand corner, the peripheral face and the left-hand corner of the grinding wheel 12, after which the mechanism is deenergized.

It is to be understood that during the first pass across the grinding wheel 12 by the truing roller 11, since the truing roller 11 is rotating, the truing operation will be a rough truing operation. However, since the truing roller is fixed against rotation when making the return pass across the grinding wheel 12, it will be seen that the second pass performs a light truing operation. Thus, the grinding wheel 12 is reshaped to the desired contour and at the same time provided with the desired finish without an undue wearing away of the truing roller.

It is to be understood that in view of the specific configuration of the truing roller and the fact that it rotates about an axis parallel to the axis of the grinding wheel 12, it is possible for the truing roller to be fixed against rotation during the reverse pass thereof across the grinding wheel 12 so that not only may the peripheral face of the grinding wheel 12 be dressed while the truing roller is fixed against rotation, but also the two corners thereof.

Although only a preferred embodiment of the invention has been specifically illustrated and described herein, it is to be understood that minor variations may be made in the brake mechanism and the operation thereof without departing from the spirit of the invention.

I claim:

1. In combination with truing roller means for truing a grinding wheel, a brake mechanism said truing roller being carried by a shaft, and a cylindrical braking surface carried by said shaft, and said brake mechanism comprising a pair of supports mounted on spaced pivots, a pair of aligned brake shoes carried by said supports for engaging said braking surface, an actuator connected to one only of said supports for moving said brake shoes into and out of operative engagement with said braking surface, and means interconnecting said supports for movement in unison to provide equal braking pressures with said brake shoes, said interconnecting means including overlapping end portions of said supports disposed remote from said shoes, and a friction resistant direct connection between said end portions.

2. The combination of claim 1 wherein said supports are mounted on fixed pivots.

3. The combination of claim 1 wherein said supports are mounted on fixed pivots disposed along a line parallel to the general line of said brake shoes.

4. The combination of claim 1 wherein said direct connection includes a slide block carried by one of said end portions and a rounded member carried by the other of said end portions and engaging said slide block.

5. The combination of claim 1 wherein said actuator includes an elongated arm rigidly connected to said one support, and a fluid motor operatively engaged with said arm remote from said one support.

6. The combination of claim 1 wherein said shaft is supported by a housing, a power unit is also carried by said housing for rotating said shaft, and said brake mechanism is mounted on said housing independently of said shaft and said power unit.

7. The combination of claim 1 wherein said pivots are fixed and disposed along a line parallel to a diametrical line through said brake shoes.

8. The combination of claim 7 wherein said direct connection includes a slide block carried by one of said end portions and a rounded member carried by the other of said end portions and engaging said slide block, and said slide block being parallel to said diametrical line.